Aug. 11, 1925.
A. M. JOSEPHO
MIXING VALVE FOR FLUIDS
Filed March 12, 1925
1,549,490
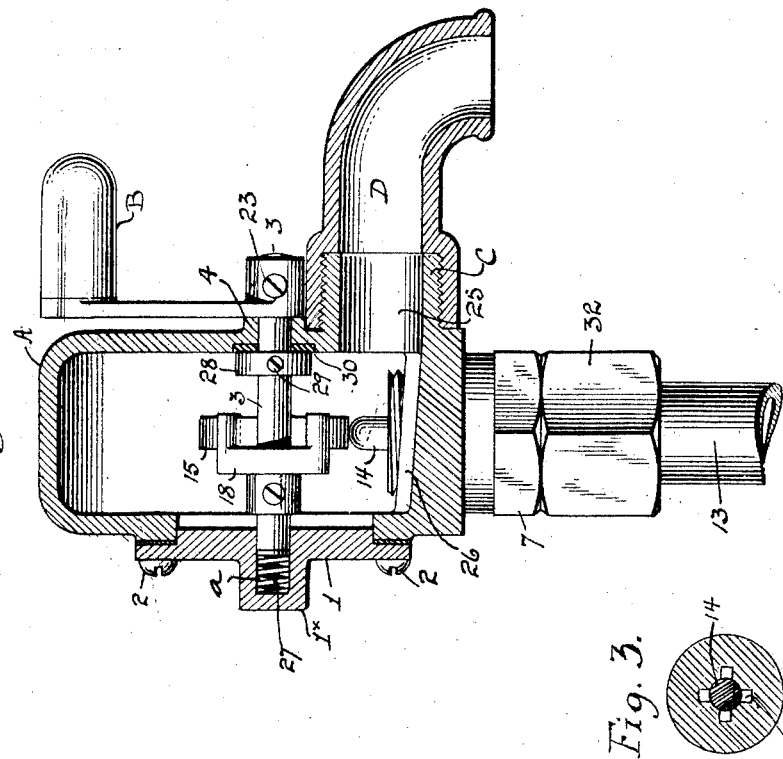
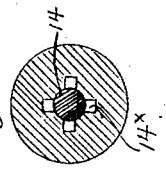
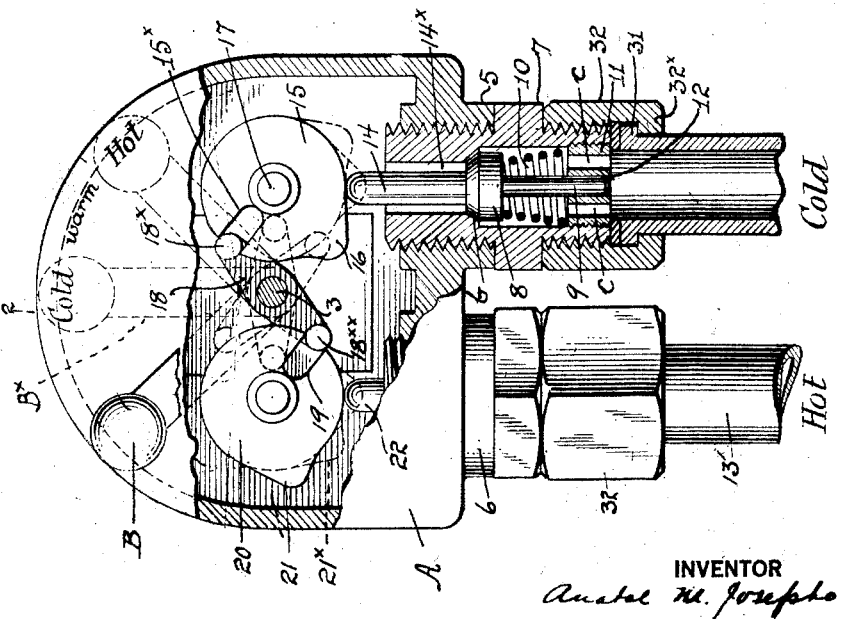
INVENTOR
Anatol M. Josepho
BY
ATTORNEY Patented Aug. 11, 1925.

1,549,490

UNITED STATES PATENT OFFICE.

ANATOL M. JOSEPHO, OF NEW YORK, N. Y.

MIXING VALVE FOR FLUIDS.

Application filed March 12, 1925. Serial No. 14,869.

*To all whom it may concern:*

Be it known that I, ANATOL M. JOSEPHO, a citizen of Latvia, and residing in New York, county and State of New York, have invented certain new and useful Improvements in Mixing Valves for Fluids, of which the following is a specification.

The object of this invention is to provide a mixing valve for fluids so constructed as to embody simple and positively acting elements which may be maintained in their assembly without derangement through use and which in operation will enable the mixing of the fluids to the desired degree by the rotation of a controlling shaft, through a handle or the like. A further object is to provide for the ready removal of the valve elements from the assembly for replacement or repair. Other objects will hereinafter appear.

The invention will be understood by reference to the accompanying drawings in which—

Figure 1 is a front elevation, partly in section, of an embodiment of the invention;

Figure 2 is a transverse section on the line 2—2, Figure 1, and

Figure 3 is a transverse section through one of the valve sleeves.

Referring to the drawings, A represents the mixing valve casing which at its rear is provided with a removable plate 1 secured in position by the screws 2. Plate 1 is provided with a boss $1^x$ which is formed with a recess $a$ for the reception of the rear end of operating shaft 3. In the front of the casing A the operating shaft 3 passes through an aperture formed in a boss 4.

At its base, casing A is provided with two projecting bosses 5, 6, each of which is provided with a central threaded aperture to receive the threaded end of a valve sleeve, one of the said sleeves being shown in longitudinal section, Figure 1. The sleeve has an intermediate shoulder portion 7 and a reduced threaded portion at each side thereof. The uppermost threaded portion extends upwardly into the interior of the mixing valve. It is provided with a conical valve seat $b$ to receive the valve head 8 carried by a stem 9. The valve is kept in normal closed position by means of a coiled spring 10, the base of which engages a member 11 adapted to adjust the tension of the spring, which member also serves as a guide for valve stem 9 being provided with a sleeve 12 in which the stem slides, the sleeve being connected by webs (not shown) to the main outer wall of the said adjusting member 11. The water flows from cold water pipe 13 through the passages $c$.

Valve head 8 of the cold water inlet has projecting upwardly therefrom a rod 14 having a rounded end in register with a cam 15. The cam has an operating nose 16, and is fixed on a shaft 17. Cam 15 is provided with a radial slot $15^x$ adapted to receive the stud $18^x$ at one end of operating lever 18 fixed upon operating shaft 3. The operating lever at its opposite end is provided with a second stud $18^{xx}$ which enters radial aperture 19 formed in cam 20, which cam is provided with an operating nose 21 for engaging the end of rod 22, which is connected to the hot water valve member and supporting units, the latter being constructed in accordance with the units above described and shown in longitudinal section, Figure 1.

Operating shaft 3 has secured thereto by means of said screw 23 an operating handle B.

The front face of casing A is provided with a boss C threaded on its exterior and provided with a central passage-way 25, which is in register with downwardly inclined lower wall 26 of the mixing chamber. Threaded upon boss C is the discharge faucet D.

Referring again to Figure 2, it will be seen that behind operating shaft 3 in boss $1^x$ is a coiled spring 27 acting upon the end of shaft 3 to move the latter forwardly. This movement is resisted by a collar 28 secured upon the shaft by set screw 29 and acting against a washer 30 which surrounds the shaft on the interior of the casing. By this means the washer is maintained compressed about the shaft, the washer being of relatively yielding material. Thus leakage of water around shaft 3 to the exterior of the casing is prevented.

It will be noted that the removal of the valve and operating elements may readily be obtained. Each feed pipe 13, $13^x$ is formed with a horizontal upper shoulder 31 which is engaged by the flange $32^x$ of an adjusting sleeve 32 threaded upon the lower reduced end of the valve sleeve. When sleeve 32 is rotated downwardly, pipe 13 will be released and access may be had to the valve spring adjusting member 11, which may be rotated so as to further compress the spring if desired to more firmly seat the valve or which may be removed to permit withdrawal of the valve 8 for replacement or repairs. The conical valve head may be provided with a washer if desired, which washer can be replaced when worn.

In the operation of the device, movement of the operating handle B to the right from its position shown in full lines, Figure 1, to the dotted line position B×, will bring the operating nose 21 of cam 20 to the dotted line position 21× somewhat to the left hand side of the hot water valve rod 22. The operating nose 16 of cam 15, however, will be carried, by such movement, into engagement with the operating rod 14 of the cold water valve. The latter valve will be moved downward to the extreme position so that cold water alone will flow into the mixing chamber. A lesser movement of the operating handle to the left from its said full line position will, of course, admit a smaller quantity of cold water to the mixing chamber. Further movement of the operating handle to the right from position B× will move the hot water operating cam to slightly depress the hot water valve whilst the cold water operating cam 15 will be moved to a position wherein the cold water valve partially closes. Therefore, both hot and cold water will flow into the mixing chamber in accordance with the degree of movement of the operating handle to the right. When the operating handle is moved all the way to the right, the cold water operating cam nose will pass beyond operative position and the cold water valve will become closed, whereas the hot water operating cam nose 21 will reach a position wherein the valve rod 22 assumes its lowermost position and a full flow of hot water will pass into the mixing chamber.

It will be understood that various modifications may be made in the form and arrangement of the elements illustrated in the drawings, without departing from the spirit of my invention, what I claim and desire to secure by Letters Patent being as follows:—

1. In a mixing valve for liquids, a casing, conduits discharging into the casing, valves controlling the outlets of said conduits, valve stems connected to said valves, a plurality of cams engaging said valve stems, a valve operating lever provided with projecting studs, means carried by a plurality of said cams whereby movement of the lever will cause said studs to impart motion to the cams, and operating means for said lever.

2. In a mixing valve for liquids, a casing, fluid conduits discharging into said casing, valves controlling the outlets of said conduits, valve stems carried by valves, cams within the casing and engaging said valve stems, two of said cams being journalled within the casing for rotary movement, an operating lever provided with an operating shaft intermediate its length, studs carried by said lever at its ends and engaging faces on said cams whereby movement of the lever will act to successively operate said valve rods.

3. In mixing valves for liquids, a casing, fluid conduits discharging into said casing, including a valve sleeve having an intermediate shoulder and reduced threaded end portions, the interior of said sleeve being formed with a valve seat, a valve head and valve stem disposed in said sleeve, a spring under said valve head and a threaded adjusting sleeve below said spring, the adjusting sleeve being provided with a guide-way for the valve stem and with passages for the flow of the liquid.

4. In a mixing valve for liquids, a casing, fluid conduits discharging into said casing, valves controlling the outlets of said conduits, a valve operating lever, a shaft for said lever projecting through the casing, an operating member for said shaft exterior of the casing, a spring tending to force said shaft endwise, a washer surrounding the shaft within the casing and a member carried by said shaft for transferring the pressure of said spring to the washer.

5. In a mixing valve for liquids, a casing, fluid conduits discharging into said casing, valves controlling the outlets of said conduits and valve operating means comprising a plurality of cams and an intermediate lever having studs engaging walls of said cams, whereby the latter are rotated.

In testimony whereof, I have signed my name to this specification.

ANATOL M. JOSEPHO.